United States Patent [19]
Murphree

[11] Patent Number: 5,330,062
[45] Date of Patent: Jul. 19, 1994

[54] LIGHT TREE DISPLAY FOR A HORIZONTAL CAROUSEL

[75] Inventor: Michael L. Murphree, Naperville, Ill.

[73] Assignee: White Consolidated Industries, Inc., Cleveland, Ohio

[21] Appl. No.: 974,252

[22] Filed: Nov. 10, 1992

[51] Int. Cl.$^5$ .............................................. A47F 5/00
[52] U.S. Cl. ............................. 211/122; 312/198; 198/793
[58] Field of Search .............. 211/122, 1.51, 1.56, 211/1.57, 1.5, 162; 198/793, 570; 312/97, 268, 198

[56] References Cited

U.S. PATENT DOCUMENTS

| | | |
|---|---|---|
| 2,905,516 | 9/1959 | Wallace et al. . |
| 4,239,435 | 12/1980 | Weiss et al. . |
| 4,379,602 | 4/1983 | Iemura et al. . |
| 4,422,554 | 12/1983 | Lichti . |
| 4,484,288 | 11/1984 | Riemenschneider . |
| 4,531,789 | 7/1985 | Iemura et al. . |
| 4,574,962 | 3/1986 | Tabler et al. . |
| 4,618,932 | 10/1986 | Sauer . |
| 4,651,863 | 3/1987 | Reuter et al. . |
| 4,813,752 | 3/1989 | Schindler . |
| 4,821,887 | 4/1989 | Iemura et al. . |
| 4,968,207 | 11/1990 | Lichti . |
| 4,973,952 | 11/1990 | Malec et al. . |
| 4,983,097 | 1/1991 | Ema et al. . |
| 5,207,335 | 5/1993 | Voelz ................... 211/122 |

Primary Examiner—Robert W. Gibson, Jr.
Attorney, Agent, or Firm—Pearne, Gordon, McCoy & Granger

[57] ABSTRACT

A programmable, visible display system or "light tree" for indicating loading and picking information to an operator of a storage conveyor of the horizontal carousel type is disclosed. The system includes a vertically extending array of regularly spaced lightable elements that is located adjacent the position occupied by a selected shelf of trays or bins for containing items to be stored or distributed. The display is programmed to match the vertical spacing of the shelves in each carrier of the storage conveyor so as to display information regarding the number of items to be removed from or placed in the bins when adjacent to the array, such information being horizontally aligned with the associated bin.

25 Claims, 3 Drawing Sheets

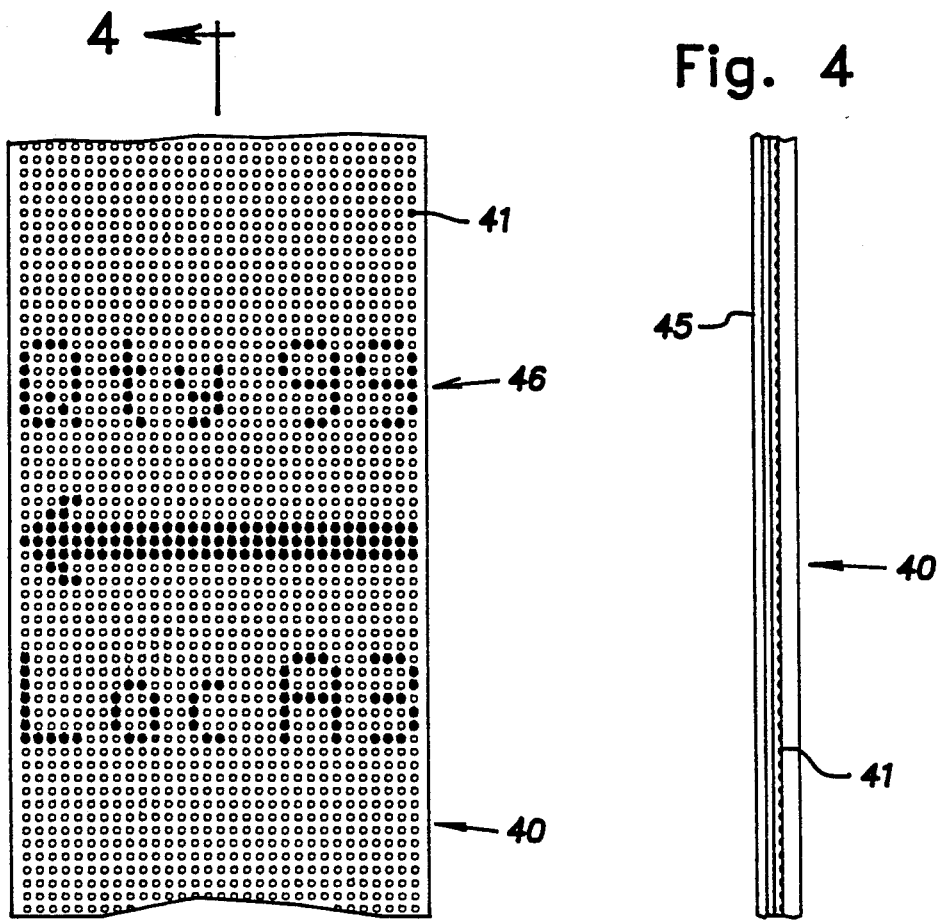

LIGHT TREE DISPLAY FOR A HORIZONTAL CAROUSEL

BACKGROUND OF THE INVENTION

1. Field of the Invention

This invention relates generally to the field of horizontal storage carousels and specifically to a display for communicating information about a carousel and items stored therein to an operator.

2. Description of Related Art

Storage conveyors of the horizontal carousel type enjoy widespread use for storing and delivering items for manufacturing and shipping. A typical carousel has an endless series of vertical carriers that run on a horizontal oval path. Shelves are mounted on the carriers and one or more storage trays or bins rest on each shelf. The shelves can be vertically adjustable to provide for different sized bins. Usually the carousel is motor driven and often the motor is electronically controlled by a microprocessor or microcomputer.

Items to be stored are placed in the bins at one or more loading stations adjacent the carousel. At some later time, items in the bins are retrieved at one or more picking stations which may be the same as the loading stations. In some cases, two or more adjacent carousels have the same loading or picking station so that items can be picked from either carousel or transferred from one carousel to another. It is necessary for an operator performing a loading operation to know which bins are before him and which items are to be stored in those bins. Similar information is required for picking.

One means of displaying information to an operator includes a plurality of digital, electronic displays of the seven segment or "figure-eight" type. Sets of several displays are grouped at a certain vertical spacing to show numerical codes or certain alphabetic characters. These displays are custom made for a particular shelf arrangement so that each set of displays is at an appropriate height so as to be adjacent the shelves for which that group displays information.

These displays perform adequately when the characters to be displayed can be shown by a seven segment display and when the shelves are permanently installed at uniform levels around the entire carousel. However, there are many characters which cannot be generated by such displays and the location, size and number of characters is limited to the location, size and number of figure-eights placed side by side. Moreover, when the shelves are adjustable or are at staggered heights around the carousel, such a display may not be aligned with the shelf for which it is providing information, possibly leading to confusion, delay or mistake during loading or picking.

Thus, a means of displaying information is desired which is capable of automatically displaying a broader range of characters and is easily adaptable to a carousel with shelves at differing heights.

SUMMARY OF THE INVENTION

An improved carousel system for delivering objects to a loading or picking station and communicating information to an operator is disclosed. The invention includes a horizontally movable carousel having a plurality of vertically spaced shelves for storing and delivering objects to a specific location. A visible display including an array of regularly spaced, lightable elements is positioned adjacent the carousel and substantially spans the vertical height of the carousel. Means to operate the display responsive to an operating condition of the horizontal carousel is provided such that loading or picking information regarding a selected shelf is displayed substantially horizontally aligned with and adjacent that shelf.

The carousel is motor driven and includes a microprocessor based motor controller. Carousel movement is controlled by a microcomputer which provides input to the motor controller. Information regarding carousel location can be fed back to the computer from the motor controller or a position sensor on the carousel. The computer stores information about the items to be stored in or picked from the bins. The computer also stores, sends and receives other operational information.

The display or light tree is a programmable, vertical column of lights or reflectors similar to message displays used in airports, banks, buses and stock exchanges. These displays have great flexibility in the types of messages and symbols which they can display. Letters, numbers, arrows, punctuation and many other graphic symbols can be displayed in different sizes, locations and colors. Different symbols can be displayed simultaneously and symbols can flash or move across the display. The display can be a single vertical unit or a series of vertically spaced horizontal modules.

The display is driven by a microprocessor based controller which receives signals from the microcomputer either directly or through the motor controller. Information about each carrier, shelf or bin, such as the number of items to be loaded or picked, is entered and stored in the computer before or during operation. Messages relevant to this information are also stored in the microcomputer. The signals from the computer cause the display to show the messages which are pertinent to the shelves and bins which are adjacent the display at a particular time. For a display located near a picking station, for example, the display may indicate, immediately adjacent a shelf, a quantity of items to be picked and from which one of several bins on the shelf. Where two carousels are adjacent each other, a display can be placed between them to indicate from which of the two carousels an item is to be picked or to simultaneously indicate that an item should be transferred from a bin on one carousel to a bin on the other carousel. Fault alarms or other system information can be indicated by text or symbols on the display. Full text messages provide the additional feature that the operator need not be familiar with numerical or abbreviated codes.

A "task complete" switch is provided at a loading station, for example, so that the operator, when loading at a particular position is finished, can trip the switch. The switch indicates to the computer that loading is complete. The computer sends a signal to the motor controller to move the carousel to the next position and sends a signal to the display to show information relating to the next carousel position. The operator then begins the next loading operation and continues until all loading is complete. Thus, the invention affords a more effective means of providing information to a carousel operator and more efficient loading and picking.

BRIEF DESCRIPTION OF THE DRAWINGS

FIG. 3 is a detail of a display having an uninterrupted array of lightable elements;

FIG. 4 is a section along 4—4 of a display having a transparent touch pad over the face of the display;

FIG. 5 is a detail of a display having vertically spaced modules of light emitting elements.

DESCRIPTION OF THE PREFERRED EMBODIMENTS

Figure 1:
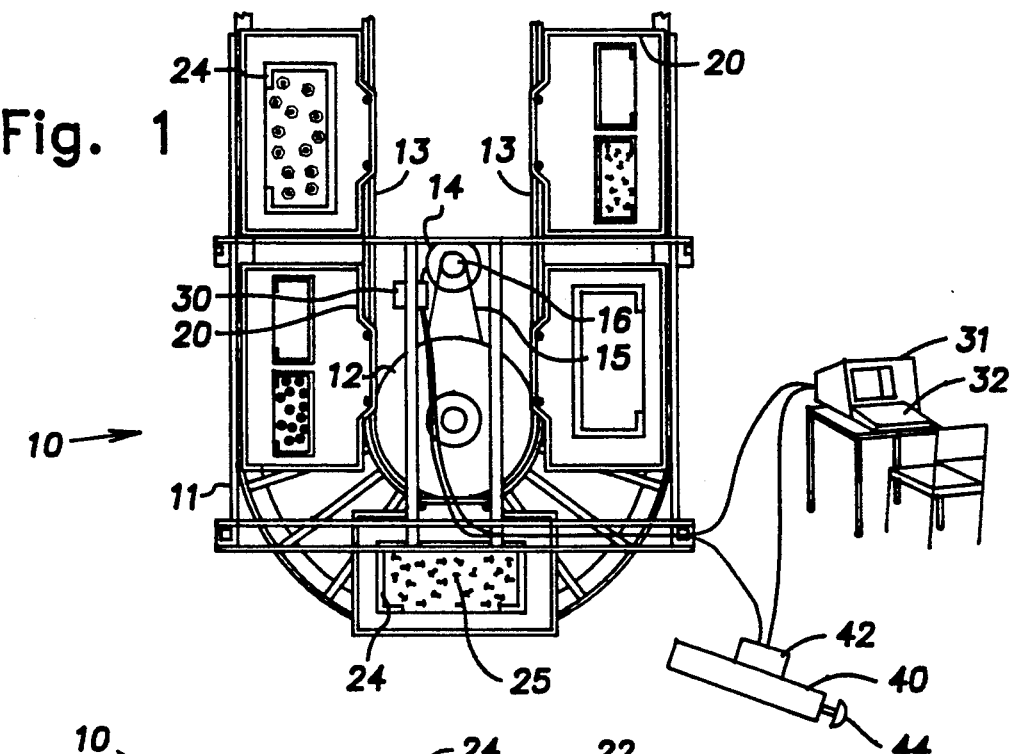
FIG. 1 is a top view, partially schematic, of a carousel and display according to the invention.
Figure 2:
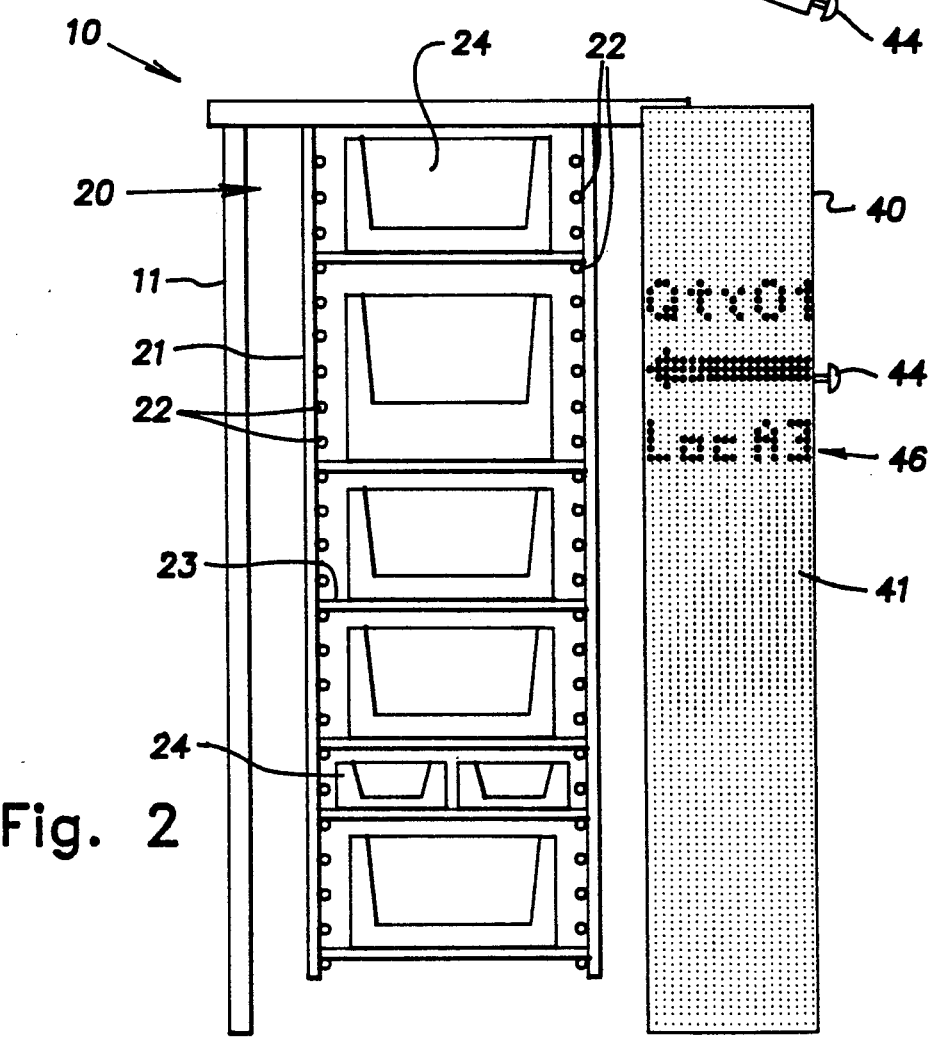
FIG. 2 is an elevation of a carousel and display at a loading or picking station.

A horizontal carousel 10, as shown in FIGS. 1 and 2, has a carousel frame 11 on which a driven pulley 12 or sprocket is rotatably mounted. The driven pulley 12 or sprocket and generally one or more undriven pulleys or sprockets (not shown) support an endless belt 13 or chain. A motor 14 is mounted on the carousel frame 11 and a drive belt 15 or chain extends between a motor pulley 16 on the motor and the driven pulley 12 or sprocket. Rotation of the motor 14 causes the endless belt 13 to move about a closed loop path defined by the placement of the pulleys which support the belt.

A plurality of carriers 20 hang from the endless belt 13 and move with the belt. The carriers 20 can also be supported by a track or additional belts. Each carrier 20 includes a vertical carrier frame 21 having a plurality of shelf supports 22. Shelves 23 rest on the shelf supports 22 and one or more bins 24 or trays can rest on each shelf 23. The shelves 23 can be fixed in position, but for more flexibility, they should be vertically adjustable. Thus, the shelf supports 22 can be located, for example, every three inches so that shelves 23 can be set at different heights to accommodate different sized bins 24 or to hold different sized objects. The shelves 23 on each carrier 20 are independently adjustable so that the height and number of shelves may differ from one carrier to the next. The bins 24 may be attached to the shelf 23 or carrier 20 or they may be freely movable. Items 25 are placed in the bins 24 which move around the path of the carousel with the carrier 20 and endless belt 13 to deliver the items to a particular location.

There are innumerable ways of constructing a horizontal carousel. Above is a description of only one typical assembly, however, the present invention can apply to any of the various horizontal carousel designs now known or to be developed in the future.

Operation of the motor 14 is controlled by a microprocessor based motor controller 30 capable of moving the carousel to a designated position in response to input signals, providing an output signal indicating carousel position and providing fault condition signals. A microcomputer 31 having a keyboard 32 can be connected to the motor controller 30 to provide a means for inputting and receiving command signals and system operating information.

A display 40 is located adjacent the carousel frame 11 facing a loading or picking station. The display 40 can be any one of a number of known types which use an array of lightable elements 41 or dots to form symbols such as alphanumeric characters. As is known in the art, the lightable elements can be directly lightable, such as light emitting diodes or incandescent lamps which are energized to generate light, or indirectly lightable such as liquid crystal displays, reflective disks or magnetic dots which reflect or obstruct an independent light source. The lightable elements 41 are preferably light emitting diodes. A microprocessor based display controller 42 selectively lights certain elements to form numbers, letters and other symbols including graphic depictions in response to input from the motor controller 30 or microcomputer 31. The symbols can be displayed in different sizes, locations and colors.

The array of elements 41 can be uninterrupted, as shown in FIG. 3, such as a standard LED display board stood on end, or it can be a plurality of vertically spaced modules 43, as shown in FIG. 5. When separate modules 43 are used, they should be vertically spaced to correspond with the vertical spacing of the shelves 23 or, if the shelves are adjustable, with the spacing of the shelf supports 22. Messages can then be displayed at a height corresponding to a selected shelf regardless of where on the carrier the shelf is located.

The display can also include a means to control the carousel which is operatively connected to the motor controller 30 directly, through the microcomputer 31, or through the display controller 42. The carousel control means can include a switch or button 44, on or near the display 40. The button can be as simple as a normally open switch connected to the motor controller. Alternatively, the carousel control may include a transparent touch pad 45, as shown in FIG. 4, of a type known in the art, placed over the face of the display 40. Such touch pads are electronically responsive to contact from an operator's finger, for example. The touch pad 45 discriminates between contact at different locations to provide a control signal indication of a location touched. The touch pad can be coordinated with the display so that a certain symbol is displayed behind a location on the touch pad which, when touched, signifies a response related to the corresponding symbol.

The microcomputer is programmed to control carousel movement and display messages according to signals provided by the motor controller 30 and display controller 42. These signals include carousel movement information, carousel location information and job status information generated by the button 44 or touch pad 45.

Figure 6:
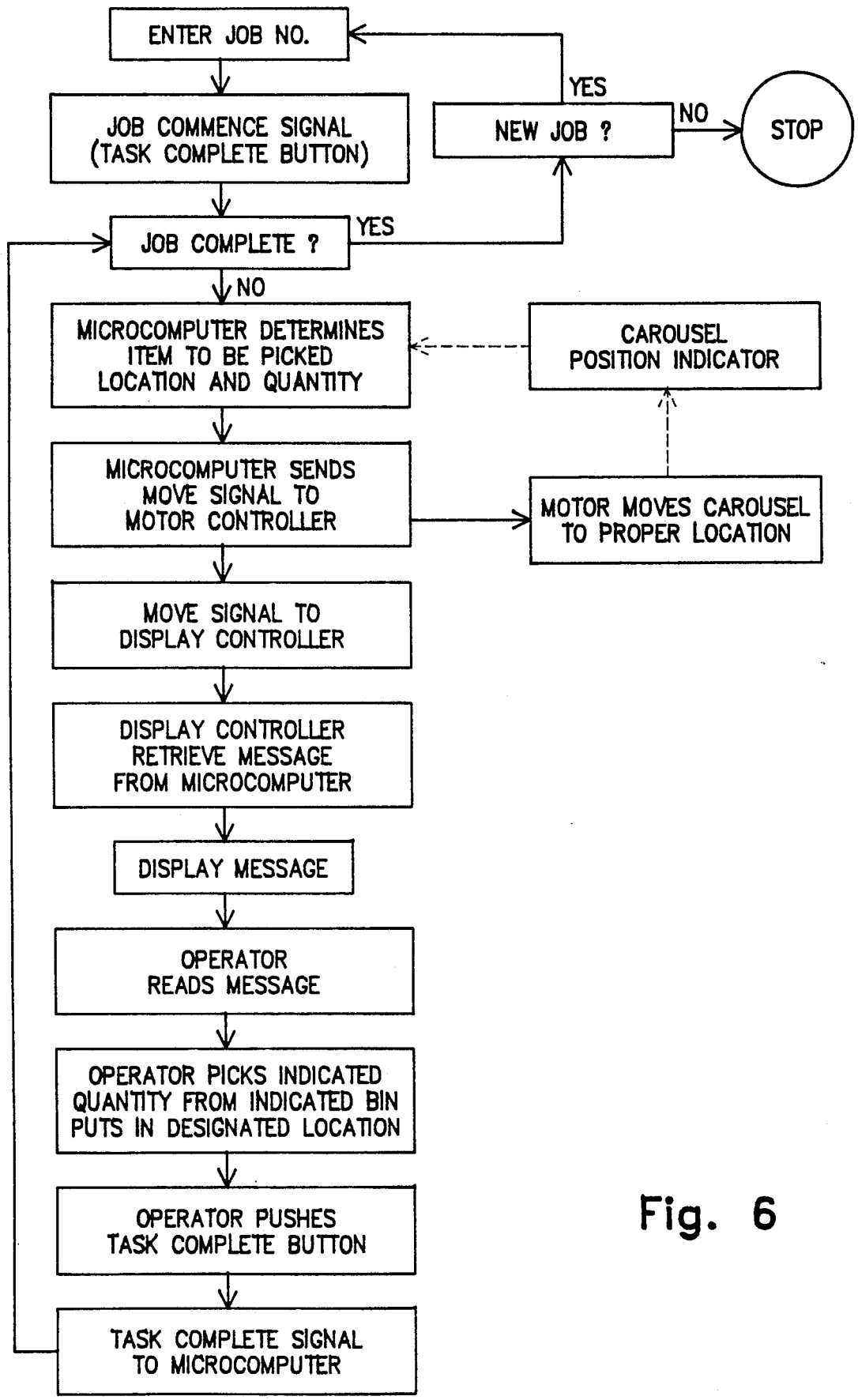
FIG. 6 is a flow chart showing a picking operation in accordance with one embodiment of the invention.

With reference to FIG. 6, the procedure followed in preparation for and execution of a typical picking operation is described below.

Prior to any picking jobs, the carousel system has been prepared. The microcomputer has been programmed with standard messages which are used for most jobs. The bins have been loaded and information about the contents of each bin or shelf has been entered or has been determined from previous loading and picking jobs.

In preparation for particular picking jobs performed by an operator, information about the jobs must be entered into the microcomputer 31 through the keyboard 32 or some other data transfer means. Typically, this information includes the quantity of items to be loaded into or picked from each bin during each of several jobs that will be performed. Also, special messages to be displayed for each position of the carousel and any other information to be displayed about a job are entered into the microcomputer.

In a normal picking operation, an operator stands at a picking station adjacent the carousel 10. The operator might have several boxes or other containers into which items 25 are to be placed for transportation to another location. The carousel 10 and appurtenant devices described above are energized and the operator enters into the microcomputer 31 via the keyboard 32 a job number or other information regarding the job to be performed.

The operator then presses the button 44 on the display 40 or otherwise indicates commencement of the job to the system. Pushing the button 44 sends a signal to the microcomputer 31 that the operator is ready to begin. The computer determines which shelf 23 holds the first items to be picked by the operator for the job which was entered into the microcomputer. The microcomputer then sends a "move" signal to the motor controller 30 and to the display controller 42. The motor controller energizes the motor 14 to move the carousel until the shelf holding the first items to be picked is in front of the picking station. Simultaneously, the display controller 42 causes the display 40 to show a message 46 for the operator. The message has been previously programmed into the display controller through the microcomputer or is stored in the microcomputer and retrieved by the display controller 42. The message is displayed at the same height as the shelf from which the first items are to be picked. The message 46 shows, for example, the number of items to be picked, an arrow pointing to the shelf and identification of which bin of several on the shelf contains the items or into which box the items are to be placed after being picked, as shown in FIG. 2.

The operator reads the display board, picks the designated quantity of items from the specified bin and places them in the appropriate box. After picking, the operator pushes the button 44 to send a "task complete" signal to the microcomputer. The microcomputer sends a "move" signal to the motor controller 30 and the display controller 42 to proceed to the shelf holding the next item and display the next message. An error message can be displayed any time during the operation that a fault occurs.

In some cases, several shelves on a single carrier may hold items to be picked. In such a case, the messages can be displayed sequentially or simultaneously. If they are displayed sequentially, the operator pushes the button after each pick to display the next message. If the messages are displayed simultaneously, the operator pushes the button once after all the picks from that carrier are made. The motor controller 30 would not move the carousel until it received a "move" signal indicating that all picks from that carrier were complete.

Operation continues by repeating the steps described above. The operator can indicate completion of the job by pushing the button 44 after the last pick or entering any necessary information into the microcomputer 31. The microcomputer determines if all the picks for that job have been performed. If they have, the job is complete. The carousel is then ready for the next job which begins with the operator entering the next job number, pertinent information having been previously entered into the microcomputer. A loading job would proceed in similar fashion to a picking job except that the messages would be adapted to specify items to be loaded and the operator would remove the items from designated containers and load them into the bins or shelves.

If items are to be picked from two adjacent carriers with the display 40 in between, an arrow can point toward each shelf. If items are to be picked from one carousel and loaded to an adjacent carousel, a first arrow and message can indicate the pick and a second arrow and message can indicate the load.

The button 44 can be replaced or supplemented by the transparent touch pad 45. After completing the picking operation, the operator can then touch the pad 45 directly where the message is displayed to show completion of the task. This is especially beneficial when several messages are displayed simultaneously. The indication by the operator will be specific as to which task has been completed. Further, when other messages such as fault displays or messages interrupting the job are shown, the operator can acknowledge the message by touching the pad in front of the message. The display can then show further information or, if appropriate, the carousel can continue operation. The touch pad 45 can also be used to program the microcomputer 31 directly or to modify programming during a job, thereby eliminating the need for the operator to leave the picking station to enter information into the microcomputer.

When the display having modules is used as shown in FIG. 5, the operation is similar except that the height of the symbols displayed is more limited. However, so long as the modules are positioned to correspond with the spacing of the shelf supports, a message can be displayed at the same height as the shelf to which it applies thereby clearly indicating the location of the pick or load when the shelves are adjustable.

The present disclosure describes several embodiments of the invention, however, the invention is not limited to these embodiments. Other variations are contemplated to be within the spirit and scope of the invention and appended claims.

What I claim is:

1. A carousel system for delivering items to a loading or picking station and communicating information to an operator, comprising:
   at least one horizontally movable carousel having a plurality of vertically spaced shelves for storing and delivering items to a specific location;
   a visible display including an array of regularly spaced, lightable elements positioned adjacent the carousel and substantially spanning the vertical height of the carousel; and
   means to operate the display responsive to an operating condition of the horizontal carousel such that loading or picking information regarding a selected shelf is displayed substantially horizontally aligned with and adjacent that shelf.

2. A carousel system according to claim 1, further comprising at least one bin on each shelf.

3. A carousel system according to claim 1, wherein the shelves are vertically adjustable.

4. A carousel system according to claim 3, wherein the display includes a plurality of modules of regularly spaced, lightable elements, the modules being vertically spaced at a distance substantially equal to the minimum spacing between the shelves.

5. A carousel system according to claim 1, wherein the lightable elements are light emitting diodes.

6. A carousel system according to claim 1, wherein the lightable elements are liquid crystal displays.

7. A carousel system according to claim 1, wherein the lightable elements are incandescent lamps.

8. A carousel system according to claim 1, wherein the lightable elements are reflective disks.

9. A carousel system according to claim 1, wherein the lightable elements are magnetic dots.

10. A carousel system according to claim 1, wherein the display is an uninterrupted array of regularly spaced, lightable elements.

11. A carousel system according to claim 1, wherein the display includes a plurality of vertically spaced modules of regularly spaced, lightable elements.

12. A carousel system according to claim 11, wherein the modules are vertically spaced at a distance substantially equal to the minimum spacing between the shelves.

13. A carousel system according to claim 1, wherein the display is capable of displaying graphic symbols.

14. A carousel system according to claim 1, wherein the display is capable of displaying any alphanumeric character.

15. A carousel system according to claim 1, wherein the display is in multiple colors.

16. A carousel system according to claim 1, further comprising means to determine the position of the carousel operatively connected to the display operating means.

17. A carousel system according to claim 16, wherein the position determining means is connected to a microcomputer which controls movement of the carousel.

18. A carousel system according to claim 16, wherein the display operating means is responsive to the position of the carousel.

19. A carousel system according to claim 1, further comprising means to control the carousel responsive to operator input.

20. A carousel system according to claim 19, wherein the operator responsive means controls movement of the carousel.

21. A carousel system according to claim 19, wherein the means responsive to operator input is at least one button pushed at the completion of a picking or loading operation.

22. A carousel system according to claim 19, wherein the means responsive to operator input is a keyboard.

23. A carousel system according to claim 19, wherein the means responsive to operator input is a transparent touch pad over a face of the display.

24. A carousel system for delivering items to a loading or picking station and communicating information to an operator, comprising:

a horizontally movable carousel having a plurality of vertically adjustable, vertically spaced shelves for storing and delivering items to a specific location;

a visible display including an array of regularly spaced, lightable elements positioned adjacent the carousel and substantially spanning the vertical height of the carousel;

means to operate the display responsive to an operating condition of the horizontal carousel such that loading or picking information regarding a selected shelf is displayed substantially horizontally aligned with and adjacent that shelf; and means to determine the position of the carousel operatively connected to the display operating means so that the display operating means is responsive to the position of the carousel.

25. A carousel system for delivering items to a loading or picking station and communicating information to an operator, comprising:

a horizontally movable carousel having a plurality of vertically adjustable, vertically spaced shelves for storing and delivering items to a specific location;

a visible display including a plurality of modules of regularly spaced, lightable elements capable of displaying graphic symbols and positioned adjacent the carousel and substantially spanning the vertical height of the carousel, the modules being vertically spaced at a distance substantially equal to the minimum spacing between the shelves;

means to operate the display responsive to an operating condition of the horizontal carousel such that loading or picking information regarding a selected shelf is displayed substantially horizontally aligned with and adjacent that shelf;

means to control the carousel including a switch tripped by the operator at the completion of a picking or loading operation;

means to determine the position of the carousel operatively connected to the display operating means so that the display operating means is responsive to the position of the carousel.

* * * * *